United States Patent [19]
Redden et al.

[11] Patent Number: 5,490,087
[45] Date of Patent: Feb. 6, 1996

[54] RADIO CHANNEL ACCESS CONTROL

[75] Inventors: James P. Redden, Mesa; David Terris, Phoenix; Michael W. Krutz, Chandler, all of Ariz.

[73] Assignee: Motorola, Inc., Schaumburg, Ill.

[21] Appl. No.: 161,613

[22] Filed: Dec. 6, 1993

[51] Int. Cl.$^6$ ..................... H04Q 7/00
[52] U.S. Cl. .............. 364/514 C; 379/59; 455/33.1
[58] Field of Search ............ 364/514 C; 455/33.1, 455/26.1, 34.1; 379/59, 62; 340/825.52

[56] References Cited

U.S. PATENT DOCUMENTS

| | | | |
|---|---|---|---|
| 4,315,262 | 2/1982 | Acampora et al. | 343/100 ST |
| 4,901,340 | 2/1990 | Parker et al. | 379/60 |
| 4,916,728 | 4/1990 | Blair | 379/59 |
| 4,979,118 | 12/1990 | Kheradpir | 364/436 |
| 5,012,469 | 4/1991 | Sardana | 370/95.3 |
| 5,038,398 | 8/1991 | Wills | 455/13 |
| 5,097,499 | 3/1992 | Cosentino | 379/59 |
| 5,123,110 | 6/1992 | Grube | 455/33.1 |
| 5,226,045 | 6/1993 | Chuang | 370/95.3 |
| 5,227,802 | 7/1993 | Pullman et al. | 342/352 |
| 5,268,694 | 12/1993 | Jan et al. | 342/354 |
| 5,276,730 | 1/1994 | Cimini, Jr. et al. | 379/60 |
| 5,276,911 | 1/1994 | Levine et al. | 455/53.1 |
| 5,287,541 | 2/1994 | Davis et al. | 455/12.1 |
| 5,293,576 | 3/1994 | Mihm, Jr. et al. | 380/21 |
| 5,335,278 | 8/1994 | Matchett et al. | 380/23 |
| 5,337,345 | 8/1994 | Cassidy et al. | 379/58 |
| 5,361,399 | 11/1994 | Linquist et al. | 455/56.1 |
| 5,363,428 | 11/1994 | Nagashima | 379/58 |
| 5,367,304 | 11/1994 | Jan et al. | 342/352 |
| 5,371,780 | 12/1994 | Amitay | 379/58 |

FOREIGN PATENT DOCUMENTS

| | | |
|---|---|---|
| 0227099 | 7/1987 | European Pat. Off. . |
| 0562374 | 9/1993 | European Pat. Off. . |

OTHER PUBLICATIONS

An article entitled "Mobile Satellite Communications" by Theresa C. Wang and Ellen Pickethall, Modern Science & Technology of Telecommunications, Nov., 1991.

Primary Examiner—Emanuel T. Voeltz
Assistant Examiner—Patrick J. Assovad
Attorney, Agent, or Firm—Gregory J. Gorrie

[57] ABSTRACT

A cellular telecommunication system comprised of low-Earth orbiting satellites featuring allocation of communication channels among users in cells is disclosed. Each subscriber unit is programmed with an embedded class identifier. During periods when it is desirable to limit acquisition of a satellite to some restricted class or set of classes, such as periods of heavy use, the satellite broadcasts a list of inhibited class identifiers allowing only uninhibited classes access to the communication system. The method reduces thrashing by allowing access to users on a hierarchy class basis. The method uses both real time cell loading data and historical cell loading information based on previous experiences and can be programmed to limit access to emergency services in the case of natural disasters.

23 Claims, 6 Drawing Sheets

RADIO CHANNEL ACCESS CONTROL

CROSS-REFERENCE TO RELATED APPLICATIONS

This application is related to U.S. patent application Ser. Nos. 07/909,487, filed on Jul. 6 of 1992, now U.S. Pat. No. 5,268,694; 07/795,610, filed on Nov. 21, 1991, now U.S. Pat. No. 5,293,576; and 08/031,586, entitled "COMMUNICATION SYSTEM EMPLOYING SPECTRUM REUSE ON A SPHERICAL SURFACE" and filed on Mar. 15 of 1993 now U.S. Pat. No. 5,367,304, which are assigned to the same assignee as the present application.

1. Technical Field of the Invention

The present invention relates generally to communication systems. More specifically, the present invention relates to systems that divide an area within which communications are to take place into cells and which allocates limited spectral resources among the various users in the cells.

2. Background of the Invention

Conventional cellular communication systems, adopt a method for subscribers to access the communication system. Generally speaking, system antennas are erected at spaced apart locations. Each system antenna, along with transmitter power, receiver sensitivity, and geographical features, defines a cell location and size. A cell is a geographical area on the surface of the earth within which communications may take place via a subscriber unit having predetermined operating characteristics and via the cell's antenna. In a cellular system that efficiently uses the spectrum allocated to it, system antennas are located to minimize overlap between their respective cells and to reduce gaps between the cells.

The spectrum allocated to a conventional cellular system is divided into a few discrete portions, typically frequency bands (also referred to as "channels"). Each cell is allocated one or more of the discrete portions of the spectrum, and each cell is preferably surrounded by cells that use other discrete portions of the spectrum. Communications within a cell use only the discrete portion of the spectrum allocated to the cell, and interference between communications taking place in other nearby cells is minimized because communications in such nearby cells use different portions of the Spectrum. Co-channel cells are cells that reuse the same discrete portion of spectrum. To minimize interference, the frequency reuse plan spaces co-channel cells a predetermined distance apart.

In conventional cellular communication systems, subscriber units acquire a radio channel by randomly selecting one of several acquisition channels provided by the system in a specific area of coverage, for example, a cell. To gain access to the communication system, the subscriber unit initiates a protocol with the system in an acquisition channel. Examples of protocols include ALOHA-type protocols well known in the art. The subscriber unit receives as part of the protocol, an assignment of a specific channel called the traffic channel on which to communicate.

ALOHA schemes typically comprise four modes: 1) Transmission Mode where users transmit an acquisition request message to the system; 2) Listening Mode where after transmitting the acquisition request message, the user listens for an acquisition acknowledgment (ACK) or a negative acknowledgment (NAK) from the communication system; 3) Re-transmission Mode where the acquisition request message is re-transmitted to the system when a NAK has been received; and 4) Timeout Mode, the user re-transmitts the acquisition request message when the user does not receive a ACK or NAK within a specified period of time. Problems occur with ALOHA protocol schemes when transmissions from various users overlap in time (i.e. collide) causing reception errors. This phenomena is known as "thrashing".

One of the major problems with ALOHA schemes is the collision of transmissions from users simultaneously attempting to access a communication system. Examples of ALOHA protocols that reduce reception errors include slotted ALOHA (S-ALOHA) and reservation ALOHA (R-ALOHA). In a S-ALOHA protocol, a sequence of synchronization pulses are broadcast to all stations, and as with most ALOHA schemes, packet lengths are constant. Users are required to transmit messages in the time slot between synchronization pulses, and can be started only at the beginning of a time slot. S-ALOHA reduces the amount of collisions between users requesting access since only messages transmitted in the same time slot can interfere with one another.

R-ALOHA protocol schemes employ two basic modes: an unreserved mode and a reserved mode. In the unreserved mode, a time frame is established and divided into a number of small reservation sub-slots. Users use these small sub-slots to reserve message slots. After requesting a reservation, the user listens for an acknowledgment and slot assignment. In the reserved mode, a time frame is divided into M+1 slots whenever a reservation is made. The first M slots are used for message transmissions, while the last slot is subdivided into sub-slots to be used for reservation requests. Users send message packets only in their assigned portions of the M slots.

A system with multiple users having random access typically uses a controller to impose order. The controller periodically polls the user population to determine their service requests. If the user population is large (i.e. in the thousands) and the traffic is bursty, the time required to poll can be excessive. Techniques for polling including "Binary Tree Search" and "Straight Polling" are well known in the art.

With both S-ALOHA and R-ALOHA in a system with many users and under cases of heavy loading, there may be significant interference between subscriber units on the acquisition channel. As a result, relatively few subscriber units may actually complete the protocol and receive assignment of an acquisition channel. Further, it is possible that even while a subscriber unit may succeed in completing an acquisition protocol, no traffic channels are available for assignment. This is a waste of resources by the subscriber unit and the communication system. In a satellite based communication system, this problem is more serious because of the need to conserve limited spacecraft resources, such as for example, satellite battery energy.

What is needed is a means and method that reduces collisions between users transmitting on an acquisition channel. Further, what is needed is a means and method to prevent assignment of an acquisition channel to a subscriber unit when no traffic channels are available. What is also needed is a means and method to allow a subscriber unit to determine when service is not available without excess transmissions, and to limit acquisition to the communication system to restricted classes or sets of classes when service capacity is limited.

Thus, there continues to be a need for an improved communication system to support multiple users and to minimize the number of unsuccessful acquisition attempts.

SUMMARY OF THE INVENTION

An advantage of the present invention is to provide a method of controlling access of subscriber units to a communication system comprised of a plurality of nodes where each node of the plurality has at least one antenna beam associated therewith and each of the subscriber units has a user class associated therewith. The method comprises identifying a geographic area likely to exhibit overload during a planning interval, calculating a proportion of users in the geographic area desired to be blocked from accessing the communication system and forming a set of inhibited user classes to inhibit in the geographic area based on the proportion. The method further comprises creating a parameter set which includes the set of inhibited user classes, identifying at least one node of the plurality of nodes and an associated antenna beam expected to service the geographic area during the planning interval and sending the parameter set to at least one node. The method further comprises broadcasting by the node in the associated antenna beam on a broadcast channel, the parameter set wherein the subscriber units of the set of inhibited user classes are prevented from accessing the communication system.

Another advantage of the present invention is to provide a method of limiting access to users of a communication system which is accessible through subscriber units that have a user class associated therewith. The method comprises the steps of selecting by a subscriber unit a strongest antenna beam from a plurality of antenna beams, the plurality of antenna beams being associated with at least one node of the communication system, the antenna beams having broadcast channels, traffic channels and acquisition channels associated therewith. The method also includes receiving at the subscriber unit in the broadcast channel associated with the strongest antenna beam, a parameter set which includes inhibited user classes. The method further includes determining by the subscriber unit if the user class associated with the subscriber unit is one of the inhibited user classes received in the parameter set, and informing a user of the subscriber unit, when the user class associated with the subscriber unit is one of the inhibited user classes, that service is not presently available.

In a preferred embodiment, the method comprises the steps of determining if a second antenna beam of the plurality of antenna beams is available when the user class associated with the subscriber unit is one of the inhibited user classes, the determination based on a signal strength of the other antenna beams, and selecting by the subscriber unit, the second antenna beam if the second antenna beam is available. The method further comprises receiving at the subscriber unit in the broadcast channel associated with the second antenna beam, a second parameter set which includes a second list of inhibited user classes, and determining by the subscriber unit if the user class associated with the subscriber unit is one of the inhibited user classes received in the second parameter set.

In another preferred embodiment, the method comprises the steps of initiating an access protocol on the acquisition channel associated with the strongest antenna beam when the user class associated with the subscriber unit is not one of the inhibited user classes received in the parameter set, and receiving on the acquisition channel, an assignment of a traffic channel upon successful completion of the access protocol, the traffic channel associated with the strongest antenna beam.

Another advantage of the present invention is to provide a method of operating a node in a communication system where the node has a plurality of antenna beams associated therewith, each antenna beam of the plurality of antenna beams has a demand for communication services associated therewith, and the antenna beams have broadcast channels, traffic channels and acquisition channels associated therewith. The method comprises the steps of receiving from the communication system, a parameter set associated with at least one antenna beam of the plurality of antenna beams which includes a list of inhibited user classes for the one antenna beam, and determining if an available number of traffic channels associated with the antenna beam is below a reserve threshold. The method further comprises modifying the parameter set to include a list of regular user classes when the available number of traffic channels in at least one antenna beam is below the reserve threshold, and broadcasting the parameter set in an associated broadcast channel of at least one antenna beam.

Another advantage of the present invention is to provide a communication system having a plurality of nodes. The system comprises an antenna coupled to one node of the plurality where the antenna produces an antenna beam, a multi-channel transceiver coupled to the antenna where the multi-channel transceiver is capable of transmitting and receiving orthogonal channel sets in the antenna beam, and a processor coupled to the multi-channel transceiver. The system further comprises a storage medium coupled to the processor wherein the combination of the processor and the storage medium identify a geographic area likely to exhibit overload during a planning interval, and calculate a proportion of users in the geographic area to be blocked from accessing the communication system. The combination of the processor and the storage medium further form a set of inhibited user classes to inhibit in the geographic area based on the proportion, create a parameter set which includes the set of inhibited user classes, and identify a node of the plurality of nodes and an associated antenna beam expected to service the geographic area during the planning interval. The combination of the processor and the storage medium also send the parameter set to the node, and the multi-channel transceiver broadcasts in the associated antenna beam on a broadcast channel, the parameter set. As a result, subscriber units of the set of inhibited user classes are prevented from initiating access to the communication system.

DETAILED DESCRIPTION OF THE DRAWINGS

A "satellite" is defined herein to mean a man-made object or vehicle intended to orbit a celestial body (e.g., Earth.). The word Earth is intended to include any celestial body around which a communication satellite may orbit. A "constellation" is defined herein to mean an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof. The term "satellite" is intended to include both geostationary and orbiting satellites and/or combinations thereof including low earth orbiting (LEO) satellites.

FIG; 1 illustrates a highly simplified diagram of satellite-based communication system 10, dispersed over and surrounding a celestial body (e.g., Earth) through use of orbiting satellites 12 occupying orbits 14. The present invention is applicable to systems including satellites having low-Earth, medium-Earth and geo-synchronous orbits. Additionally, it is applicable to orbits having any angle of inclination (e.g., polar, equatorial or other orbital pattern).

Figure 1:
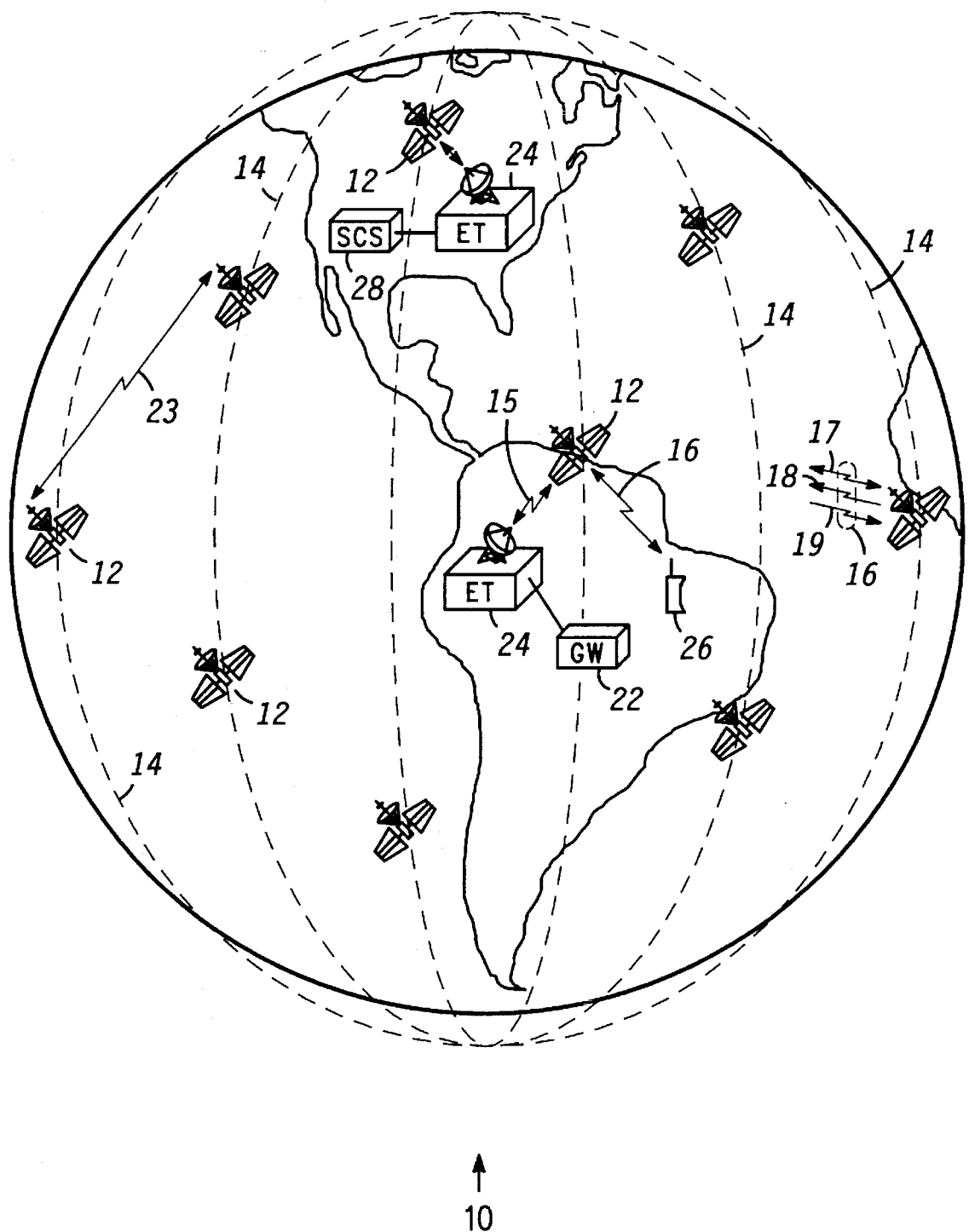
FIG. 1 illustrates a highly simplified diagram of a satellite based communication system.

Exemplary communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

For example, each orbit 14 encircles Earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of Earth at any instant.

For the example shown, satellites 12 travel with respect to Earth at around 25,000 km/hr, allowing satellite 12 to be visible to a terrestrial station for a maximum period of circa nine minutes.

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

Communication system 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications (infra) or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation. To support real-time communications, a time division multiple access (TDMA) scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geo-political boundaries. In the preferred embodiments, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on Earth's surface at all times (i.e., full coverage of the Earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

The present invention is also applicable to constellations where full coverage of the Earth is not achieved (i.e., where there are "holes" in the communications coverage provided by the constellation) and constellations where plural coverage of portions of Earth occur (i.e., more than one satellite is in view of a point on the Earth's surface).

Figure 2:
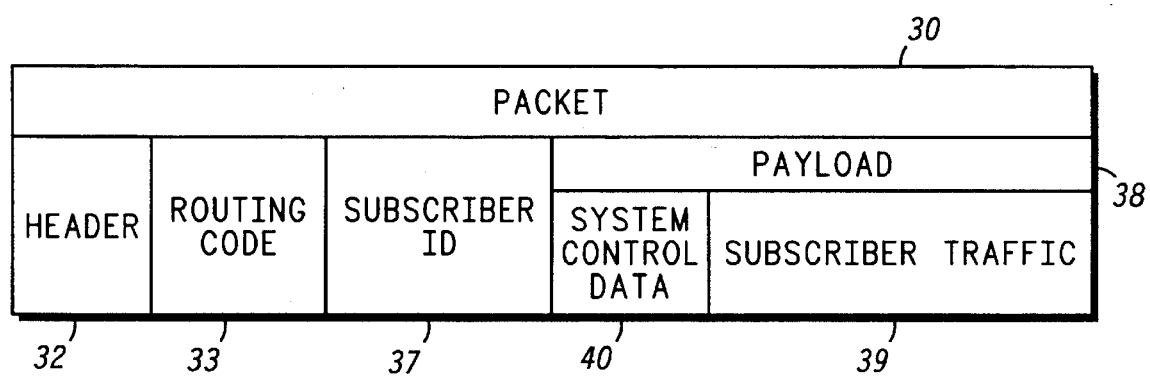
FIG. 2 illustrates an example of an exemplary data packet used to transport communications in a preferred embodiment of the present invention.

As discussed above, communications in the preferred embodiments are configured into a digital format. FIG. 2 shows a block diagram of exemplary data packet 30 that may be used to transport a communication to subscriber unit 26. Packet 30 includes header 32 which carries data identifying a type characterization to be associated with packet 30, a length to be associated with packet 30, and any other information conventionally included in data packet headers. The type characterization may indicate whether packet 30 exclusively conveys system control messages or whether it conveys subscriber traffic. Routing code 33 is include to instruct network 10 (FIG. 1) where to deliver packet 30.

Subscriber ID 37 represents a code that uniquely identifies subscriber unit 26 and that is known to the identified subscriber unit and any satellite 12 (FIG. 1) providing traffic channel 17 (FIG. 1) to subscriber unit 26. Subscriber unit 26 monitors subscriber IDs 37 transmitted over broadcast channel 18 (FIG. 1) to determine if packets 30 are intended for it. Satellite 12 uses subscriber IDs 37 of packets 30 that carry subscriber unit traffic to route such packets 30 to traffic channels 17 assigned to the identified subscriber unit 26.

Header 32, routing code 33, and subscriber ID 37 represent overhead data which serve to get packet 30 to its destination. At the packet's destination, payload data 38 are consumed. In other words, the purpose of sending packet 30 to a destination is typically to deliver payload data 38, not header 32, routing code 33, or subscriber ID 37. Payload data 38 includes either system control data 40 or system control data 40 together with subscriber traffic 39 (e.g., voice and/or data). System control data are commands or messages which are interpreted and acted upon by subscriber units 26. These commands are typically very short. When system control data are delivered over broadcast channel 18, subscriber traffic 39 is omitted, and the resulting packet is very short so that as many messages as possible may be broadcase over broadcast channel 18. Subscriber traffic 39 represents all subscriber data transported in the course of a call. When packet 30 is delivered over traffic channel 17, a significant amount of subscriber traffic is appended. As discussed above, a digitized version of an entire frame of conversational audio may be conveyed by subscriber traffic 39.

Compared to the size of subscriber traffic 39, the length of system Control data 40 is insignificant. Thus, system control data 40 may be delivered to subscriber unit 26 along with subscriber traffic 39 while a call is ongoing. Examples of system control messages which may be delivered with subscriber traffic 39 via a traffic channel 17 include messages which inform subscriber unit 26 that the other party to a call has "hung-up", that another call is waiting for the subscriber unit 26, and any number of annunciation data messages which result in a voice message or another form of annunciation being presented to the user of subscriber unit 26. An annunciation which may be presented to the user while a call is ongoing may, for example, warn a user when communication services are soon to become unavailable or when a service condition warrants. This annunciation may also desirably warn the user of when the user's particular class is being inhibited as discussed later.

Figure 3:
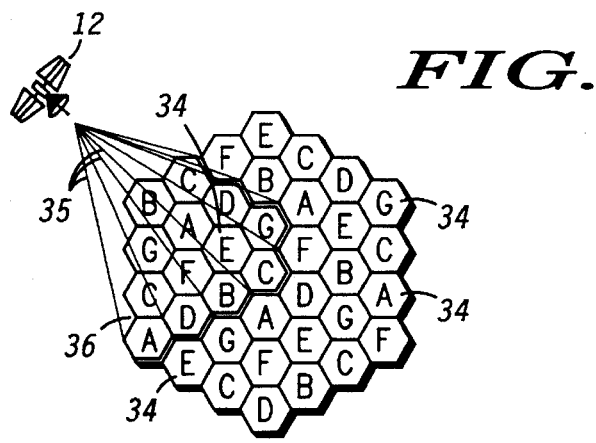
FIG. 3 illustrates a simplified layout diagram of a portion of a cellular pattern formed on the surface of the earth by satellites for the communication system of FIG. 1.

FIG. 3 shows a typical layout diagram of a cellular antenna pattern projected by satellites 12 on the celestial body. Each satellite 12 includes an array (not shown) of directional antennas. Each array projects numerous discrete antenna beams 35 on the earth's surface at numerous diverse angles away from its satellite 12. FIG. 3 shows a diagram of a resulting pattern of cells 34 that satellites 12 form on the surface of the earth. A footprint region 36, which is bounded by a double line in FIG. 3, results from the antenna beams 35 produced by an antenna array of a single satellite 12. Cells 34, which reside outside of region 36, are produced by antenna arrays from other satellites 12.

The precise number of channel sets into which the spectrum used by satellites 12 is divided is not important to the present invention. FIG. 3 illustrates an exemplary assignment of channel sets to cells 34 in accordance with the present invention and in accordance with a division of the spectrum into seven discrete channel sets. FIG. 3 references the seven discrete channel sets through the use of the characters "A", "B", "C", "D", "E", "F", and "G". Those skilled in the art will appreciate that a different number of channel sets, for example twelve, may be used and that, if a different number is used the resulting assignment of channel sets to cells 34 will differ from the assignment pattern depicted in FIG. 3. Likewise, those skilled in the art will appreciate that each channel set may include one channel or any number of orthogonal channels therein. As illustrated in FIG. 3, the assignment of channel sets to cells 34 allows the limited spectrum to be reused in geographically spaced apart cells 34. In other words, non-orthogonal channel sets simultaneously carry communications without interference because the cells 34 where the non-orthogonal channel sets are used are spaced apart from one another and do not overlap. Moreover, each subscriber unit 26 is capable of operating with any of the discrete channel sets, and the particular channel set used at any particular time by any particular subscriber unit 26 is controlled by communication system 10.

Typically, cellular communication systems use various methods to allocate the limited electo-magnetic spectrum available for each cell. In Frequency Division Multiplexing (FDM) or Frequency Division Multiple Access (FDMA) systems, specified sub-bands of frequency are allocated from the communication resource (i.e. the limited electro-magnetic spectrum allocated for use). In a FDM/FDMA cellular communication system each cell is assigned to one of these groups of frequencies so as to not interfere with adjacent or nearby cells. For example, in a seven frequency reuse scheme, e.g. see FIG. 3, the frequency assignments are fixed to the seven discrete channel sets noted as characters "A", "B", "C", "D", "E", "F", and "G" as previously described. The seven frequency reuse arrangement of cells helps prevent interference between cells with identical frequency assignments (i.e. co-channel cells) by separating these cells by at least two cells of different frequency assignments although it is more desirable to have only one cell separating co-channel cells.

Cellular communication systems also use Time Division Multiplexing (TDM) or Time Division Multiple Access (TDMA) where there are periodically recurring time slots during which message information of a particular user is transmitted/received. The users are assigned to particular time slots controlled by a master controller synchronized by a master clock. In reference to FIG. 3, each discrete channel set noted as characters "A", "B", "C", "D", "E", "F", and "G" can be assigned one time slot. Each cell can use the same frequency channel or channel set without interference because the users in each cell only receive or transmit information during their assigned time slot. Each time slot can contain one message packet (i.e., single message time slots) or can contain multiple message packets (i.e., multiple sub-time slots each containing a single message).

In some applications, it is desirable to use a combination of FDMA and TDMA. For example, instead of using the same frequency channels or channel sets for a network and allocating different time slots to different cells, it is possible to rotate frequencies among the cells and assign the same or different time slot per cell. With FDMA and TDMA, some frequencies or time slots are usually reserved for access signalling and/or control, and are not ordinarily available for conventional conversations and/or user data transfer (i.e., for access protocol). Some channels and/or time slots of the combination FDMA/TDMA system of a preferred embodiment of the present invention are also desirably reserved for the same purpose. FDMA and TDMA communication techniques and combinations thereof are well known to those of skill in the art.

The communication resource, (i.e. limited electromagnetic spectrum) can also be partitioned by the use of a hybrid combination of FDMA and TDMA known in the art as Code Division Multiplexing (CDM) or Code Division Multiple Access (CDMA). CDMA is a spread spectrum technique in which specified members of a set of orthogonal or nearly orthogonal spread spectrum codes are allocated, each using the full channel bandwidth. Two common spread spectrum techniques are direct-sequence and frequency hopping. These communication techniques are well known in the art.

Other techniques in the art for allocation of the communication resource include Space Diversity (SD) and Polarization Diversity (PD). In an SD system spot beam antennas can be used to separate radio signals by pointing in different directions. This also allows for reuse of the same frequency band. In a PD communication system, orthogonal polarizations are used to separate signals also allowing for reuse of the same frequency band. These communication techniques are also well known in the art.

While the specific communication technique (i.e. method of allocating the communication resource) is not important for the present invention, those of skill in the art will understand that any one or combination of the above described communication techniques can be used in the present invention.

Figure 4:
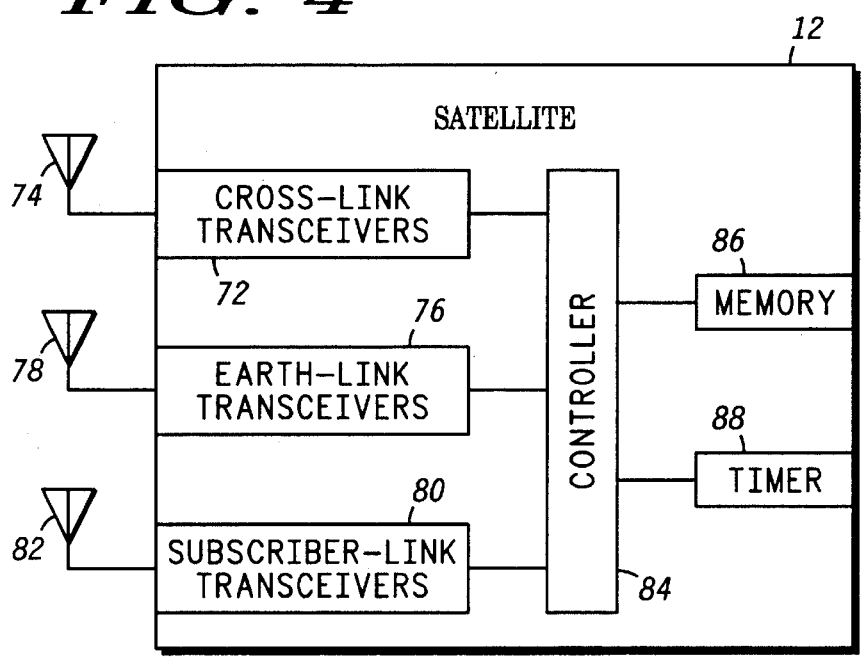
FIG. 4 illustrates a simplified block diagram of a satellite radio communication station suitable for use in a preferred embodiment of the present invention.

FIG. 4 shows a block diagram of a radio communication station provided by a satellite 12. Preferably, all satellites 12 within communication system 10 (see FIG. 1) include equipment as illustrated by the block diagram of FIG. 4. Satellite 12 includes cross-link transceivers 72 and associated antennas 74. Transceivers 72 and antennas 74 support cross-links to other nearby satellites 12. Earth-link transceivers 76 and associated antennas 78 support earth-links to communicate with earth terminals 24 (FIG. 1). Moreover, subscriber-link transceivers 80 and associated antennas 82 support subscriber units 26 (FIG. 1). Preferably, each satellite 12 may simultaneously support a link for up to several thousand or more of subscriber units 26 (FIG. 1). Of course, those skilled in the art will appreciate that antennas 74, 78, and 82 may be implemented either as single multi-directional antennas or as banks of discrete antennas. It is desirable that subscriber-link antenna be a phased array antenna capable of accessing many cells 34 (FIG. 1) simultaneously.

A controller 84 couples to each of transceivers 72, 76, and 80 as well as to a memory 86 and a timer 88. Controller 84 may be implemented using one or more processors. Controller 84 uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated due to the operation of satellite 12.

Subscriber-link transceivers 80 are desirably multi-channel FDMA/TDMA transceivers capable of transmitting and receiving on all different selectable frequencies during particular, selectable, time slots as directed by controller 84. Subscriber-link transceivers 80 contain multi-channel radios having sufficient number of channels to provide the desired number of transmission and reception frequencies for signal access and control and for the user voice and/or data. Controller 84 may provide for allocation of the frequency and time-slot assignments, cell-to-cell hand-off and other overhead and management and control functions. Subscriber-link transceivers 80 desirably provide for transmission and reception on any frequency channel set so that each subscriber-link transceivers 80 may, if needed, utilize the entire spectral capacity of all frequency channel sets by having the capability to handle all frequency and time slot assignments.

Figure 5:
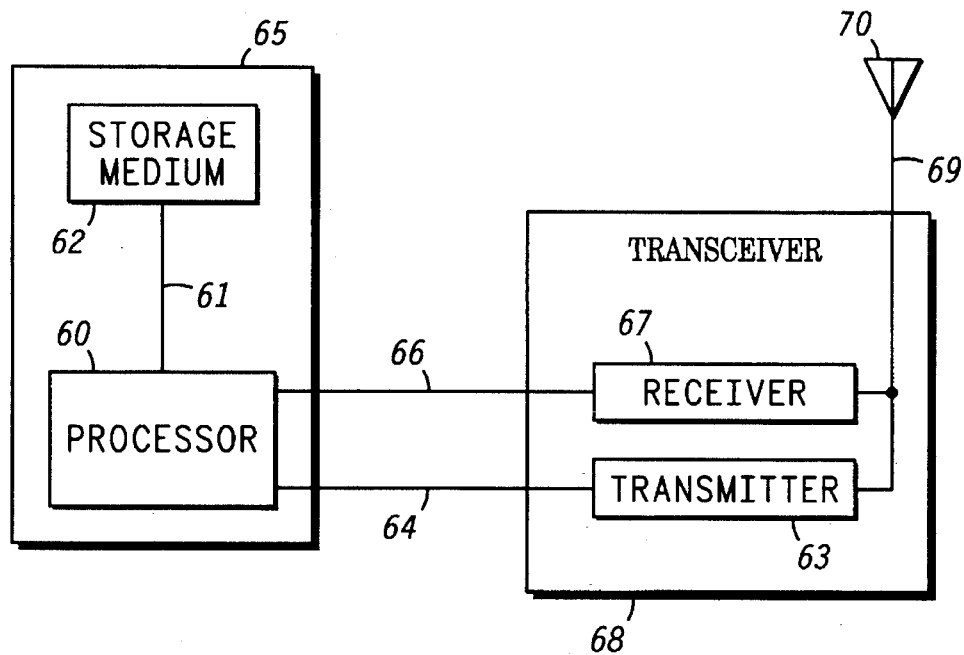
FIG. 5 illustrates a simplified block diagram of a system control station and an earth terminal suitable for a preferred embodiment of the present invention.

FIG. 5 is a simplified schematic diagram of a portion of control station 65 and a portion of terrestrial station 68 in accordance with the present invention. Control station 65 and terrestrial station 68 are desirable part of SCS 28 (FIG. 1) and ET 24 (FIG. 1) respectively. Control station 65 comprises processor 60 coupled to associated storage medium 62 (e.g., random access memory or RAM, other semiconductor or magnetic read-write memory devices, optical disk, magnetic tape, floppy disk, hard disk etc.) via link 61. Terrestrial station 68 includes antenna 70 coupled to transmitter 63 and receiver 67 via link 69. Transmitter 63 and receiver 67 are coupled to processor 60 via links 64 and 66, respectively. Processor 60 desirably carries out procedures exemplified below and described in associated text. For example, in addition to performing other tasks as appropriate, processor 60 desirably stores results from such procedures in storage medium 62. Transmitter 63 and/or receiver 67 transmit messages to and/or receive messages from satellites 12.

Conventional cellular radio units and systems are described for example in U.S. Pat. Nos. 4,783,779, 4,144, 412, and 5,097,499 and satellite communication systems are described for example in U.S. Pat. Nos. 4,722,083 and 4,819,227. These patents are herewith incorporated by reference. Subscriber-link antennas 82 (FIG. 4), subscriber-link transceivers 80 (FIG. 4), control station 28 (FIG. 1) and earth terminal 24 (FIG. 1) perform those functions and contain at least those equipments conventionally associated with switched terrestrial or satellite cellular communication systems, plus additional functions and equipment explained in more detail below.

Processor 60 generally controls and manages user access, message reception and transmission, channel set-up, radio tuning, frequency and time slot assignment, and other cellular radio communication and control functions not managed or provided for by controller 84 (FIG. 4). Among other things, processor 60 and/or controller 84 (FIG. 4) desirably executes procedures to allow user access to communication system 10. This may include procedures for protocols for channel setup and other associated functions as discussed below.

Figure 6:
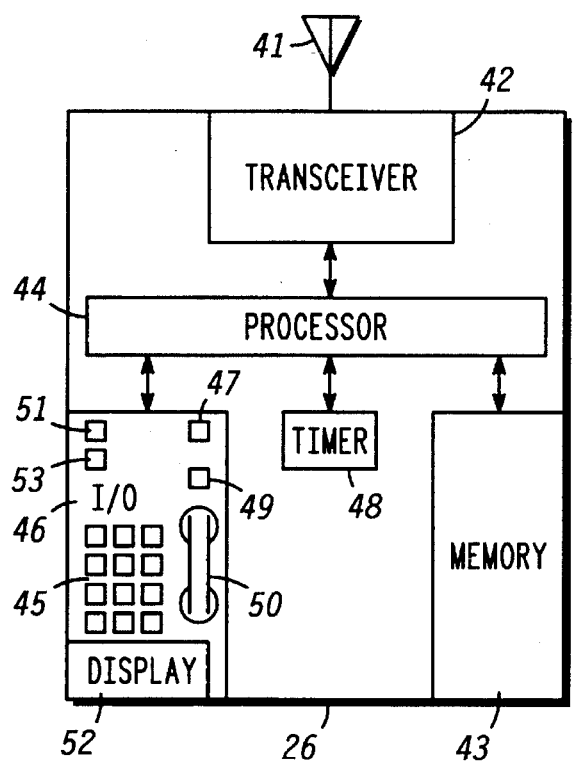
FIG. 6 illustrates a simplified block diagram of a subscriber unit suitable for a preferred embodiment of the present invention.

FIG. 6 shows a block diagram of a typical subscriber unit (SU) 26 (analogous to subscriber unit 26 of FIG. 1) which communicates with communication system 10. SU 26 may also communicate through communication system 10 to other SUs 26 or another telecommunication device. Subscriber unit 26 includes transceiver 42 which transmits and receives signals to and from communication system 10 using antenna 41. Transceiver 42 is desirably a multi-channel transceiver capable of transmitting and receiving on all frequency channels in specified time slots as required by communication system 10.

Transceiver 42 desirably comprises an acquisition channel transceiver portion, a broadcast channel receiver portion and a traffic channel transceiver portion. The acquisition channel transceiver portion communicates on one of several acquisition channels as determined by satellite 12 and is primarily used during access protocols when a subscriber desires access to communication system 10 as previously discussed. The traffic channel transceiver portion communicates with communication system 10 on a traffic channel assigned by satellite 12. Those of skill in the art will understand that the acquisition channel transceiver portion, the broadcast channel receiver portion and the traffic channel transceiver portion may be contained in one unit capable of both functions. Transceiver 42 couples to a processor 44, which controls the frequency and timing parameters upon which transceiver 42 operates. In addition, processor 44 preferably controls the power level at which transceiver 42 transmits signals. Additionally, processor 44 desirably couples to input/output (I/O) section 46, timer 48, and memory 43. Processor 44 uses timer 48 to maintain the current date and time. Memory 43 includes semiconductor, magnetic, and other storage devices for storing data which serve as instructions to processor 44 and which, when executed by processor 44, cause subscriber unit 26 to carry out procedures which are discussed below. In addition, memory 43 includes variables, tables, and databases that are manipulated due to the operation of subscriber unit 26.

Input/output (I/O) section 46 of subscriber unit 26 is used to collect inputs from a user of subscriber unit 26 and to provide outputs for the user to perceive. I/O section 46 desirably includes, for example, keypad 45 to collect numbers that identify a party to whom a call may be directed, power switch 47 to control the energization and de-energization of subscriber unit 26, send key 49 to indicate when a called party's number has been entered, and hook switch 51. Display 52 may desirably be used to present visual information to the user, and alarm or beeper 53 may desirably be used to provide an audible alert to the user. Handset or multitone 50 desirably transforms audible signals into electrical signals, and vice-versa.

To access communication system 10, subscriber unit 26 must be assigned a traffic channel 17. Traffic channel 17 may be any combination of frequency channels and/or time slots as previously discussed. To accomplish this, subscriber unit 26 selects acquisition channel 19 provided by satellite 12. Satellite 12 desirably provides several acquisition channels and in a preferred embodiment, provides at least six or more acquisition channels 19. The selection of a specific acquisition channel 19 by subscriber unit 26 may be random or selected in some predetermined manner. Once acquisition channel 19 is chosen, subscriber unit 26 initiates a protocol with satellite 12 on the acquisition channel. Desirably, subscriber unit 26 may initiate an ALOHA protocol, and preferably a slotted-ALOHA protocol well known in the art. As part of the protocol, subscriber unit 26 receives an assignment of a traffic channel 17 as previously discussed.

Under cases of heavy loading, subscriber units 26 may interfere with each other when transmitting on acquisition channel 19 with the result that relatively few subscriber units 26 actually complete a protocol and receive assignment of a transmission channel 17. This phenomena is known as "thrashing".

To reduce or prevent "thrashing" among competing subscriber units 26 during access protocols, subscriber units 26 are assigned a class identifier. Table I shows examples of several class identifiers that may be assigned to different user classes. The class identifiers may indicate special or privileged users, as in the case of system maintenance users, emergency services or a corporate executive. The class identifiers may also be assigned at random as in the case of regular subscriber classes. The precise number of classes is not important to the present invention as long as the number of members of a single class within a satellite antenna beam 35 (FIG. 3) reduces the probability of an overload condition being generated.

TABLE I

| User Class | Class Identifier |
|---|---|
| System Test and Maintenance | 1 |
| Emergency Services | 2 |
| Priority System User | 3 |
| FAA | 4 |
| . | . |
| . | . |
| . | . |
| Regular Subscribers | 13 |
| . | 14 |
| . | 15 |
| . | . |
| . | . |
| . | . |

To assign a class identifier to a subscriber unit, the class identifier is embedded in each subscriber unit. Desirably, the class identifier is placed in memory 43 (FIG. 6) of subscriber unit 26 and is done at the time of initial activation of the subscriber unit. It is preferable that the class identifier not be changed by the individual user and remain permanent while subscriber unit 26 is assigned to a specific user or user group.

By referring to FIG. 1, as previously discussed, SCS 28 provides parameters to satellites 12 to control the operation of the communication equipment (e.g., FIG. 4) provided by satellite 12. These parameters may desirably include a set of prohibited user classes (i.e., for example, user classes 7, 9, 11 of TABLE I). During periods when it is desirable to limit acquisition of a satellite to some restricted class or set of users, satellite 12 broadcasts the set of prohibited class identifiers on broadcast channel 18. Subscriber units 26 having one of the prohibited user classes will be prohibited from initiating an access protocol on acquisition channel 19 thereby being prevented from accessing satellite 12. An advantage being that a subscriber unit will not tie up acquisition channel 19 only to find out that no traffic channels 17 are available. Thus, subscriber unit 26 will not be assigned a traffic channel 17 and will not be able to communicate with system 10.

The set of prohibited user classes may desirably be varied over time to allow all users access to satellite 12. Further, during emergency situations such as natural disasters, all user classes may be prohibited access except those users embedded with the class identifier for emergency services (e.g., 2) and system test and maintenance (e.g., 1).

In other situations where many subscriber units in a footprint region 36 (FIG. 3) or single cell 34 (FIG. 3) desire access to satellite 12, the class identifier may serve as a priority ranking in which subscriber units with a lower number class identifier receive priority in access protocols over subscriber units with a higher number class identifier. For example, subscriber units 26 assigned the class identifier "2" could receive priority over those with the class identifier "4" and likewise subscriber units assigned the class identifier "14" could receive priority over those with the class identifier "15". The priority of assignment may also be rotated among the classes of regular subscribers so that, for example, higher numbered user classes are not always given lower priority than higher numbered user classes. For example, users with class identifier "15" may at times have priority over users with class identifier "13".

In Satellite based communication system 10 (FIG. 1) where satellites move with respect to each other, the relative positions of antenna beams 35 produced by different satellites 12 change. For example, when the satellites are in polar orbits 14, as satellites 12 move from the earth's equator toward a pole, beams on the edges of adjacent satellites begin to overlap and eventually the overlapping beams are turned off. It is desirable that subscriber units 26 are prevented from attempting acquisition of a satellite beam that is about to be turned off. In this situation where satellite 12 will be turning off beams, satellite 12 broadcasts parameters which may include an increasing number of prohibited user classes. For example, within 15 seconds of when a satellite beam is scheduled to be turned off, all classes may be inhibited.

By referring to FIG. 4, in a preferred embodiment controller 84 desirably measures the demand of each cell 34 (FIG. 3) by measuring the number of current and queued requests for service by SUs 26 and the loading by measuring number of SUs 26 currently being served. Controller 84 desirably calculates the demand trend of each cell 34 at predetermined intervals called planning intervals. In a preferred embodiment, controller 84 uses demand and loading information measured over the entire planning interval. The length of the planning interval would depend, among other things, on satellite load and orbit. In a preferred embodiment, the length of the interval may range between 15 seconds and one minute. Controller 84 compares the current loading and demand information to cell capacity information in memory 86 and determines how much capacity remains unused.

In another preferred embodiment, processor 60 (FIG. 5) desirably compares the current cell loading, demand and demand trend to a historical cell demand. Processor 60 also desirably forecasts for each cell, whether the cell capacity is adequate for the immediately foreseeable demand. The forecast is preferably based on demand trend, historical data and/or combinations thereof. Historical data is stored in storage medium 62 of SCS 65.

If the demand for services is approaching a predetermined level, or is predicted to approach a predetermined level (e.g., 90% of cell capacity), then processor 60 directs satellite 12 to broadcast an inhibited class or classes of users. SCS 28 desirably determines which class or classes of users to inhibit.

The historical information contained in storage medium 62 of SCS 65 is generally based on actual experience of user requests for system access and how system loading has varied by time of day, day of week, day of month, calendar date, holidays or other special event dates, and so forth. The historical information may be generated by processor 60 or controller 84 and may also be contained in memory 86 of satellite 12. Historical information in storage medium 62 may also be supplied by system operators. The historical information is desirably referenced to specific geographical locations, and preferably referenced to specific times of day, week, month, etc. where demand for services vary. For example, when satellite 12 may pass over a high demand area at rush hour, demand for services will be significantly higher than a low population density area during late night hours. Tables in storage medium 62 desirably contain demand for services based on such predictions.

If desired by a system operator, controller 84 and/or processor 60 can up-date the historical data in storage medium 62 as new experience is accumulated. Since it is expected that most overload and high demand conditions will be repetitive, that is, likely to occur during the same hours on similar days of the week and/or month, the use of historical data to forecast demand for services is of major assistance in managing when to inhibit user classes and how many require inhibiting.

While controller 84 and memory 86 are shown as contained within satellite 12, this is not essential. The functions of the controller may also be performed on the ground by SCS 28. Further, while it is preferred that processor 60 and storage medium 62 are contained within SCS 28, this is not essential. The central processor functions and memory functions may be distributed or concentrated elsewhere in the system. For example, a master control station may be used and some or all of the monitoring and management functions described above concentrated therein. Alternatively, these monitoring and/or management functions may be distributed among various levels of the system in a hierarchial network, each level being responsible for monitoring and managing capacity assignments to/from the level below (i.e., its subordinates) and seeking from the level above (i.e., its supervisor), coordination data and user access prediction data to/from peers.

With the availability of historical demand information keyed to clock and calendar, satellite 12 and/or SCS 28 can change the classes of inhibited users to match the historical hourly, daily, weekly and/or monthly fluctuations in demand when actual demand and demand trend is not monitored. The procedure of matching historical data to demand trend alone is sufficient to provide improved service even without constant monitoring of cell loading. However, real time cell load monitoring is preferable since it acts as a check on the accuracy of the prediction based on historical trends and allows the historical trends to be constantly updated.

Further, storage medium 62 may contain tables or assignments to provide a predetermined list of inhibited user classes to specific cells where there would normally be a high demand for user services such as in a high population density area. For example, in Australia where there are high population density areas along coastal regions, and relatively nearby low population density regions in centrally located desert or outback regions, inhibited user classes may be pre-determined. Another example would be along the East Coast of the United States, a high population density region. Satellite communication system 10 can initially determine inhibited user classes from cells/antenna footprints that are projected over the land area.

Figure 7:
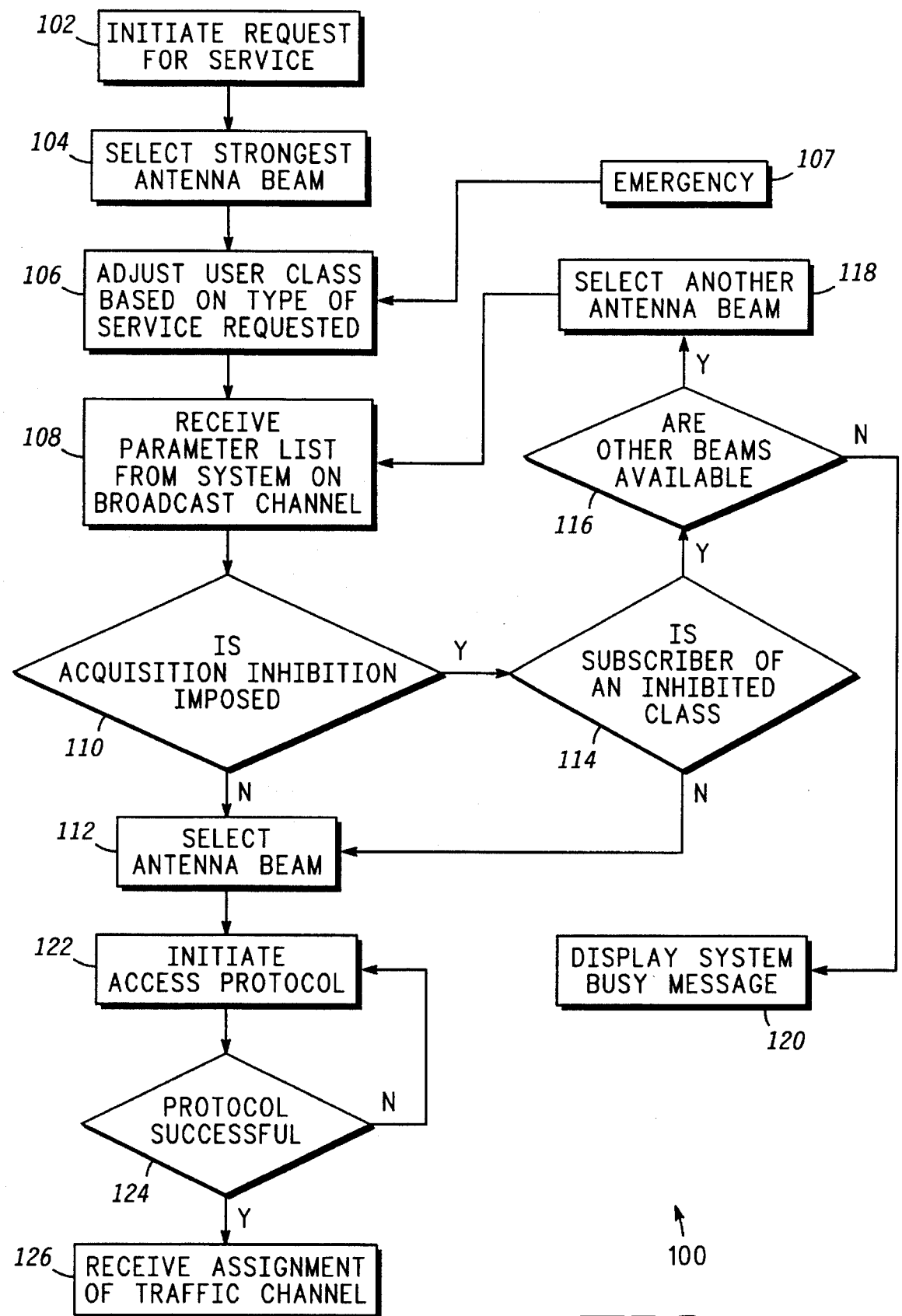
FIG. 7 shows a flow chart of procedures performed by a subscriber unit suitable for a preferred embodiment of the present invention.

FIG. 7 illustrates acquisition procedure 100 performed by subscriber unit 26 each time when access to system 10 is desired. When a user desires to initiate a communication, the user may initiate a request for service 102. This may be accomplished by either switching on the subscriber unit or dialing a desired phone number. Task 104 commands subscriber unit 26 to select an antenna beam 35 (FIG. 3) of satellite 12 with the strongest RF signal. Depending on the type of service requested, subscriber unit 26 may temporarily alter its class identifier according to task 106. For example, when a subscriber with a class identifier of "15" (see table I) requests emergency service 107, by dialing 911 for example, the subscriber unit's class identifier may be temporarily changed from "15" to "3". This temporary user class change gives the subscriber unit priority over all other subscriber units with a higher user class identifier. Once an antenna beam 35 is selected, task 108 monitors broadcast channel 18, and, among other things, receives from satellite 12 the list of user classes currently inhibited in the selected antenna beam 35. Subscriber unit 26 also receives from satellite 12 information describing which channels have been assigned as acquisition channels. If there are no inhibited class identifiers determined in task 110, task 112 selects the present antenna beam. If there are inhibited classes, task 114 compares the list of inhibited classes with the user class which has been assigned to the subscriber unit and determines if the subscriber contains one of the inhibited classes. If the subscriber unit is not one of the inhibited classes, task 112 selects the present antenna beam.

If subscriber unit's class is one of the inhibited set of classes, task 116 determines if other antenna beams from satellite 12 are available. Task 116 may base the decision on the adequacy of the signal strength of other antenna beams. If no other antenna beams are available, task 120 displays a message to the user to initiate communications at a later time. Examples of such messages may also include "system busy" messages and "try again later" messages. If other antenna beams are available and can be received by subscriber unit 26, task 118 selects another available antenna beam from satellite 12. Tasks 108 through 120 are repeated for each available antenna beam.

Once an antenna beam is finally selected by task 112, task 122 selects an acquisition channel 19 and initiates an access protocol on the selected acquisition channel. Satellite 12 desirably provides information on what frequencies and/or frequency channels the acquisition channels are located for the particular antenna beam as part of information broadcasted on the broadcast channel associated with that particular antenna beam. In a preferred embodiment, the subscriber unit initiates a Slotted ALOHA protocol on-the selected acquisition channel. Upon successful completion of an access protocol, satellite 12 assigns subscriber unit 26 a traffic channel 17 (if a traffic channel is available) in task 126 on which subscriber unit 26 may then communicate with system 10.

In a preferred embodiment of procedure 100, subscriber unit 26 may continually perform tasks 106 through 120 by continually monitoring broadcast channel 18 of antenna beam 35 and inform the user when subscriber unit 26 is inhibited or not inhibited from accessing system 10.

Figure 8:
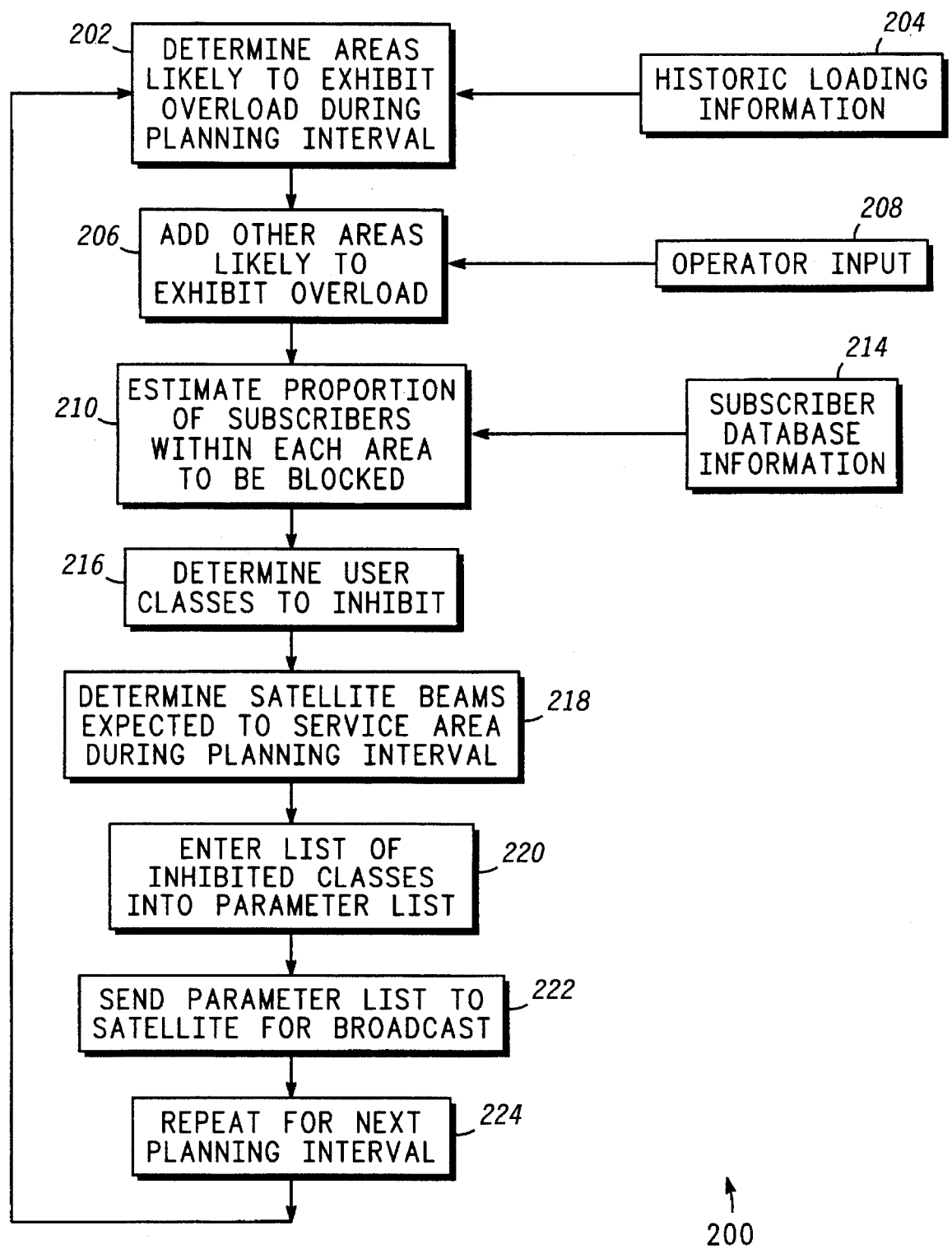
FIG. 8 shows a flow chart of procedures performed by a control station suitable for a preferred embodiment of the present invention.

FIG. 8 illustrates procedure 200 performed by control station 65 (FIG. 5) suitable for use in a preferred embodiment of the present invention. Desirably, procedure 200 is performed by control station 65 on a regular basis, and is preferably repeated every planning interval. Planning intervals may range from as short as a few seconds to as long as several hours, and are desirably between fifteen seconds and five minutes and preferably about thirty seconds. Task 202 uses historical loading information 204 to determine geographic areas that are likely to exhibit overload. Preferably, task 202 makes this determination for the current planning interval. Historical loading information may be stored in storage medium 62 (FIG. 5). Task 206 adds geographical areas expected to exhibit overload based on input from a system operator 208. Such input may include human knowledge of unusual events such as natural disasters, major events (e.g., Olympic games) etc. Task 210 will then determine a proportion of subscriber units in the geographic area expected to exhibit overload, to be blocked from attempting acquisition to system 10. This determination will desirably use subscriber database information 214 for the particular geographic location.

Task 216 will determine the specific set of class identifiers (see table I) to inhibit during the present planning interval. The selection of class identifiers to inhibit is desirably shared fairly among all subscriber classes over several planning intervals. For example, if it is necessary to inhibit only one user class of regular subscribers, subscribers assigned class identifier "13" would be inhibited one planning interval, then the next planning interval, subscribers assigned class identifier "14" would be inhibited, until all regular subscriber unit classes are inhibited before inhibiting class "13" again.

Task 218 determines the specific satellite 12 (FIG. 2) and associated antenna beams 35 (FIG. 3) expected to service the overloaded areas during the planning interval. Task 220 generates a list of inhibited classes to be included with the parameter list for the associated antenna beam. Task 222 sends the list of inhibited user classes to the specific satellite 12 for broadcast in the associated antenna beam 35 during the planning interval. Task 224 desirably waits until the next planning interval to repeat procedure 200.

Figure 9:
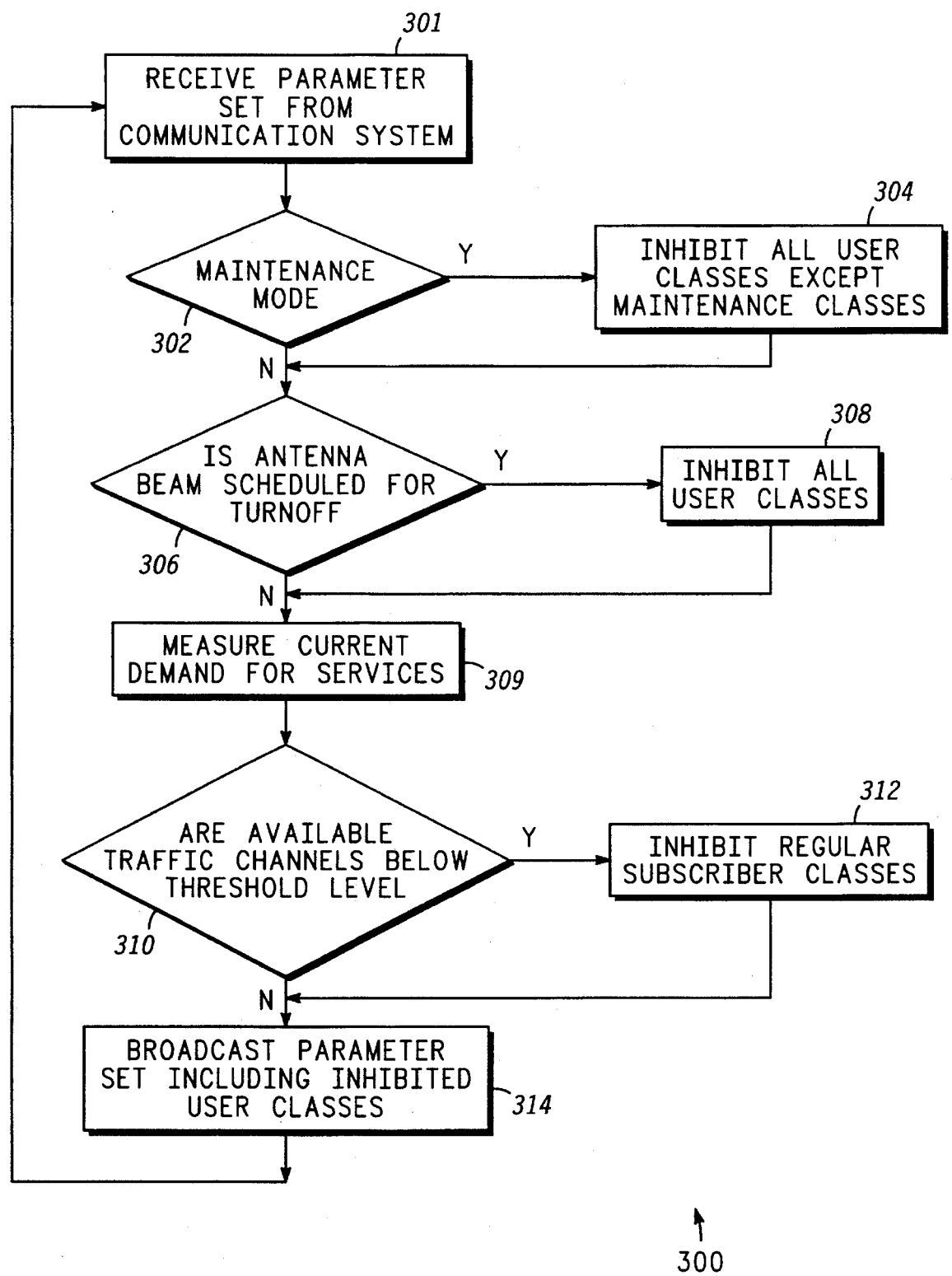
FIG. 9 shows a flow chart of procedures performed by a communication node suitable for a preferred embodiment of the present invention.

FIG. 9 illustrates procedure 300 performed by a communication node (for example, satellite 12 of FIG. 1) in a preferred embodiment of the present invention. Desirably, procedure 300 is performed once for each planning interval previously discussed. In task 301, the communication node receives a parameter set from the communication system. The parameter set desirably includes a list of inhibited user classes. In a preferred embodiment, the parameter set is generated, at least in part by procedure 200 (FIG. 8). Task 302 determines if satellite 12 is in a maintenance mode (e.g., not accepting calls from subscriber units) and if so, task 304 modifies the parameter set to include all user classes except those assigned the user class of system test and maintenance (see Table I). A maintenance mode can be initiated by sending a specific parameter set to satellite 12 by SCS 28. In a maintenance mode, all users are desirably prohibited from accessing satellite 12. If satellite 12 is not in a maintenance mode, task 306 determines if antenna beam 35 (FIG. 3) is scheduled to be turned off. If so, task 308 modifies the parameter set to include all user classes. Preferably, task 306 determines if the antenna beam is scheduled to be turned off within 15 seconds. If the antenna beam is not scheduled for turn off, task 310 determines if the number of available traffic channels is below a predetermined threshold (for example, 10%). If below the threshold, task 312 modifies the parameter set to include all subscriber classes. Task 314 broadcasts the parameter set on at least one of the broadcast channels associated with the antenna beam. The parameter set will be the original parameter set received in task 301 unless modified subsequently in tasks 304, 308 or 312. User classes listed in the parameter set will be inhibited from initiating an acquisition protocol on an acquisition channel. In a preferred embodiment, procedure 300 is repeated for each antenna beam 35 of satellite 12.

While the invention has been described in terms of specific examples and with specific preferred embodiment, it is evident that many alternatives and variations will be apparent to those skilled in the art based on the description herein, and is intended to include such variations and alternatives in the claims.

As described herein, the advantages of the present invention will be apparent to those of skill in the art and provide an improved methods of operating various parts of a communication system. These advantages include global knowledge of the anticipated load for a particular satellite that is used in addition to local knowledge of satellite loading to prevent user access and reduce collisions during acquisition protocols. Another advantage includes the fact that local loading information that is obtained by a satellite can be used to update the global information. Another advantage to the present invention is that no transmission is required by a subscriber unit to determine that service is not available. This reduces power consumption of the subscriber unit, which may be a portable hand-held device, and reduces excess traffic on the acquisition channels which have limited capacity. The invention provides a method and apparatus for both load management and user priority. Another advantage to the present invention is that a subscriber unit may temporarily adjust it's priority based on the type of service requested, for example in emergency situations.

What is claimed is:

1. A method of controlling access of subscriber units to a communication system comprised of a plurality of nodes, each node of said plurality having at least one antenna beam associated therewith, and each of said subscriber units having an assigned class identifier stored therein for discriminating among users, said assigned class identifier being either one of a plurality of regular user class identifiers or one of a plurality of special user class identifiers, said method comprising:

a) identifying a geographic area likely to exhibit overload during a planning interval;

b) calculating a proportion of users in said geographic area having regular user class identifiers desired to be temporarily blocked from accessing said communication system;

c) forming a set of temporarily inhibited class identifiers from said plurality of regular user class identifiers to inhibit in said geographic area based on said proportion;

d) creating a parameter set which includes said set of temporarily inhibited class identifiers;

e) identifying at least one node of said plurality of nodes and an associated antenna beam expected to service said geographic area during said planning interval;

f) sending said parameter set to said at least one node; and g) broadcasting by said at least one node in said associated antenna beam on a broadcast channel, said parameter set wherein subscriber units containing said temporarily inhibited class identifiers are prevented from accessing said communication system, and wherein the forming step varies said set of said inhibited class identifiers to include other regular user class identifiers of said plurality of regular user class identifiers.

2. A method as claimed in claim 1 wherein step "a" further comprises the step of identifying areas likely to exhibit overload by using predicted and historical loading information stored in said communication system.

3. A method as claimed in claim 1 further comprising the step of adding geographic areas likely to exhibit overload based on operator input.

4. A method as claimed in claim 1 wherein said forming step further comprises the step of forming a set of inhibited user identifiers using a subscriber database, said subscriber database containing a list of subscriber units associated with said geographic area and including said assigned class identifiers.

5. A method as claimed in claim 1 wherein said planning interval repeats on a continuous basis and comprises a fixed period of time ranging between fifteen seconds and five minutes, said method further comprising the step of repeating steps "a" through "g" on a substantially continuous basis for subsequent of said planning intervals.

6. A method as claimed in claim 1 wherein said calculating step comprises the step of calculating said proportion of subscriber units based on a number of available of said traffic channels.

7. A method as claimed in claim 1 wherein said regular user class identifiers are assigned to each of said subscriber units at random, and said assigned class identifier is embedded within each of said subscriber units, and wherein said special user class identifiers identify an associated subscriber unit as one of a class of special users including either a system test user, a system maintenance user, an emergency service user, or a privileged system user.

8. A method as claimed in claim 1 wherein said plurality of nodes are moving with respect to said geographic area and wherein:

a multiplicity of nodes of said plurality of nodes are expected to sequentially service said geographic area;

said sending step comprises the step of sending said parameter set to each node of said multiplicity of nodes; and said broadcasting step occurs when each node of said multiplicity of nodes is servicing said geographic area.

9. A method as claimed in claim 8 wherein said parameter set is particular to said geographic area and said broadcasting step includes the step of broadcasting said parameter set by each node of said multiplicity when said each node is servicing said geographic area and not broadcasting said parameter set when said each node is not servicing said geographic area.

10. A method of limiting access of subscriber units to a communication system comprised of a plurality of nodes, and each of said subscriber units has one assigned class identifier of a plurality of class identifiers stored therein, said method comprising:

determining class identifiers of said plurality of class identifiers to temporarily inhibit when an available number of traffic channels is below a predetermined threshold; and broadcasting said temporarily inhibited class identifiers by a node of said plurality of nodes, wherein a subscriber unit that has been assigned one of said temporarily inhibited class identifiers is prevented from requesting access to said communication system.

11. A method as claimed in claim 10 wherein said assigned class identifier is either one of a plurality of regular user class identifiers or one of a plurality of special user class identifiers, said method further comprising the steps of:

identifying a geographic area likely to exhibit overload during a planning interval, said node expected to service said geographic area during said planning interval;

determining a percentage of subscriber units having regular users class identifiers in said geographic area to be temporarily blocked from accessing said communication system;

forming a set of said class identifiers to temporarily inhibit in said geographic area based on said percentage; and varying said temporarily inhibited class identifiers of said set, wherein subscriber units having different of said class identifiers are inhibited on a substantially uniform basis.

12. A method of limiting access to users of a communication system which is accessible through subscriber units, each of said subscriber units having an assigned class identifier of a plurality of class identifiers embedded therein, said method comprising the steps of:

determining class identifiers of said plurality to temporarily inhibit when an available number of traffic channels is below a predetermined threshold;

receiving from said communication system at said subscriber unit a parameter set which includes said temporarily inhibited class identifiers;

determining by said subscriber unit if said assigned class identifier is one of said temporarily inhibited class identifiers; and displaying a message to inform a user of said subscriber unit, when said assigned class identifier is one of said temporarily inhibited class identifiers, that service is not presently available.

13. A method according to claim 12 further comprising the steps of:

selecting by one of said subscriber units, a strongest antenna beam from a plurality of antenna beams, said plurality of antenna beams being associated with at least one node of said communication system, said antenna beams having a broadcast channel, a traffic channel and an acquisition channel associated therewith;

c1) determining if a second antenna beam of said plurality of antenna beams is available when said class identifier associated with said one subscriber unit is one of said temporarily inhibited class identifiers, said determination based in part on a signal strength of other of said antenna beams;

c2) selecting by said one subscriber unit, said second antenna beam if said second antenna beam is available;

c3) receiving at said one subscriber unit in said broadcast channel associated with said second antenna beam, a second parameter set which includes a second list of temporarily inhibited class identifiers; and c4) determining by said one subscriber unit if said assigned class identifier associated with said subscriber unit is one of said assigned inhibited class identifiers received in said second parameter set.

14. A method as claimed in claim 13 further comprising the steps of:

initiating an access protocol on said acquisition channel associated with said strongest antenna beam when said assigned class identifier is not one of said temporarily inhibited class identifiers received in said parameter set; and receiving on said acquisition channel, an assignment of a traffic channel upon successful completion of said access protocol, said traffic channel being associated with said strongest antenna beam.

15. A method as claimed in claim 12 wherein said assigned class identifier is either one of a plurality of regular user class identifiers or one of a plurality of special user class identifiers, and wherein the method further comprises the steps of:

a1) initiating by said subscriber unit, a request for service; and a2) changing said assigned class identifier from a regular user class identifier to an emergency service class identifier when said request for service is a request for emergency service, said emergency service class identifier being one of said special user class identifiers.

16. A method as claimed in claim 15 wherein said assigned class identifier is embedded within said subscriber unit, and wherein said regular user class identifiers are assigned at random and, said special user class identifiers identify an associated subscriber unit as one of a class of special users including a system test user, a system maintenance user, an emergency service user, or a privileged user, and wherein said regular user class identifiers that are inhibited are varied so that subscriber units having different of said regular user class identifiers are inhibited on a substantially uniform basis.

17. A method of operating a node in a communication system that communicates with subscriber units, said node having a plurality of antenna beams associated therewith, each antenna beam of said plurality of antenna beams having a demand for communication services associated therewith, and said antenna beams having broadcast channels, traffic channels and acquisition channels associated therewith, each of said subscriber units having an assigned class identifier stored therein, said assigned class identifier being either one of a plurality of regular user class identifiers or one of a plurality of special user class identifiers, said method comprising the steps of:

receiving from said communication system, a parameter set associated with at least one antenna beam of said plurality of antenna beams which includes a list of inhibited class identifiers for said one antenna beam;

determining if an available number of traffic channels associated with said at least one antenna beam is below a reserve threshold;

modifying said parameter set to include some of said regular user class identifiers when said available number of traffic channels in said at least one antenna beam is below said reserve threshold; and broadcasting said parameter set in an associated broadcast channel of said at least one antenna beam.

18. A method according to claim 17 wherein one of said special user class identifiers is a maintenance mode class identifier, and wherein said method further comprises after said receiving step, the steps of:

determining if said node is in a maintenance mode; and modifying said parameter set to include all of said regular user class identifiers and all of said special user class identifiers except a maintenance class identifier when said node is in said maintenance mode, wherein only subscriber units having said maintenance mode class identifier may access said node of said communication system.

19. A method according to claim 17 further comprising after said receiving step, the steps of:
- determining if said one antenna beam is scheduled for turn off; and
- modifying said parameter set to include a all user class identifiers when said one antenna beam is scheduled for turn off.

20. A method as claimed in claim 17 wherein said receiving, determining, modifying and broadcasting steps are repeated for other antenna beams of said plurality of antenna beams, and wherein said regular user class identifiers are assigned at random and said assigned class identifiers are embedded within each of said subscriber units.

21. A communication system having a plurality of nodes which are accessible through subscriber units, each subscriber unit having one assigned class identifier of a plurality of class identifiers stored therein for discriminating among users, said system comprising:
- an antenna coupled to one node of said plurality, said antenna producing an antenna beam;
- a multi-channel transceiver coupled to said antenna, said multi-channel transceiver capable of transmitting and receiving orthogonal channel sets in said antenna beam;
- a processor coupled to said multi-channel transceiver; and
- a storage medium coupled to said processor, wherein the combination of said processor and said storage medium:
- a) identify a geographic area likely to exhibit overload during a planning interval;
- b) calculate a proportion of users in said geographic area to be blocked from accessing said communication system;
- c) form a set of temporarily inhibited class identifiers of said plurality of class identifiers to temporarily inhibit in said geographic area based on said proportion;
- d) create a parameter set which includes said set of temporarily inhibited class identifiers;
- e) identify a node of said plurality of nodes and an associated antenna beam expected to service said geographic area during said planning interval; and
- f) send said parameter set to said node, wherein said multi-channel transceiver broadcasts in said associated antenna beam on a broadcast channel, said parameter set, wherein subscriber units that have one of said temporarily inhibited class identifiers are prevented from initiating access to said communication system.

22. A communication system according to claim 21 wherein:
- each node of said plurality of nodes is associated with a plurality of cells and said antenna is a phased array antenna capable of accessing many cells of said plurality simultaneously, said node additionally comprises a second antenna; and said communication system additionally comprises:
- a ground link transceiver coupled to said processor;
- a ground link antenna coupled to said ground link transceiver for communicating with said second antenna; and
- a control station linked to said ground link antenna and containing said processor and said storage medium.

23. An apparatus for limiting access to a communication system comprising:
- multiple communication nodes wherein each node communicates with multiple subscriber units, each subscriber unit having one assigned class identifier of a plurality of class identifiers embedded therein for discriminating among users; and
- an antenna on each of said communication nodes for broadcasting a parameter set comprising a list of temporarily inhibited class identifiers of said plurality of said class identifiers wherein subscriber units that have one of said temporarily inhibited class identifiers are temporarily prevented from requesting access to said communication system.

\* \* \* \* \*